United States Patent
Wang et al.

(10) Patent No.: US 6,199,194 B1
(45) Date of Patent: Mar. 6, 2001

(54) METHOD AND SYSTEM FOR PROGRAMMING FIRMWARE OVER A COMPUTER NETWORK

(75) Inventors: Sin-Yaw Wang, San Jose; Christopher M. Bellman, Longmont; Elvis Lam, Oakland, all of CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/161,158

(22) Filed: Sep. 25, 1998

(51) Int. Cl.$^7$ ....................................... G06F 9/445
(52) U.S. Cl. ..................................... 717/1; 717/1; 717/2
(58) Field of Search .................... 717/1, 2; 706/206; 709/201, 212, 246, 220, 217, 300

(56) References Cited

U.S. PATENT DOCUMENTS

| | | | |
|---|---|---|---|
| 5,239,648 | * 8/1993 | Nukui | 707/10 |
| 5,367,698 | * 11/1994 | Webber et al. | 709/203 |
| 5,564,037 | * 10/1996 | Lam | 711/161 |
| 5,584,023 | * 12/1996 | Hsu | 707/204 |
| 5,706,507 | * 1/1998 | Schloss | 707/104 |
| 5,721,908 | * 2/1998 | Lagarde et al. | 707/10 |
| 5,758,344 | * 5/1998 | Prasad et al. | 707/10 |
| 5,768,510 | * 6/1998 | Gish | 709/203 |
| 5,815,709 | * 9/1998 | Waldo et al. | 712/300 |
| 5,961,586 | * 10/1999 | Pedersen | 709/201 |
| 5,974,256 | * 10/1999 | Matthews et al. | 717/5 |
| 5,987,473 | * 11/1999 | Jorgensen | 707/104 |
| 6,052,739 | * 4/2000 | Bopardikar et al. | 709/321 |
| 6,064,382 | * 5/2000 | Diedrich et al. | 345/339 |
| 6,066,181 | * 9/1998 | Demaster | 717/5 |
| 6,074,432 | * 6/2000 | Guccione | 717/2 |
| 6,110,226 | * 8/2000 | Bothner | 717/7 |

OTHER PUBLICATIONS

Unknown, "*ASUS PCI–DA2100 PCI to SCSI Disk Array Controller*" User's Manual, Hardware Installation Rev. 1.22, Nov. 1996, AUSTeK Computer, Inc.

Neary et al, "Javelin + + scalability issues in global computing", JAVA ACM, pp. 171–180, May 1999.*

Massen et al, "An efficient implementation of Java's remote method invocation", POPP ACM, pp. 173–182, Mar. 1999.*

Chang et al, Interfacting Java to the virtual interafce architecture:, JAVA ACM, pp. 51–57, May 1999.*

Newhall et al, "Performance measurement of dynamically compiled Java execuations", JAVA ACM, pp. 42–50, May 1999.*

Flint, "Sing Java API with native ada compilers", SIGADA ACM, pp. 193–203, May 1999.*

* cited by examiner

*Primary Examiner*—Mark R. Powell
*Assistant Examiner*—Anil Khatri
(74) *Attorney, Agent, or Firm*—Martine Penilla & Kim, LLP (57) ABSTRACT

A method and apparatus for programming a programmable hardware device of a local computer system that is connected to a network, uses a programming file that is resident on a remote system which is also connected to the same network. A method for facilitating such programming includes providing a Java-language program that is capable of accessing a programming file having data, providing a Java Native Interface (JNI) implementation that is capable of facilitating a sending of data from the programming file to the programmable hardware device, and providing a Java Native Interface that facilitates communication between the Java-language program and the JNI implementation. Another method for such programming by a user includes accessing a programming file having data and located on a computer system that is remote from the local system and connected to the local system through a network, using a Java program. The method also includes retrieving the data from the programming file and sending the retrieved data to the programmable hardware device, such that the retrieving and sending are facilitated by using a particular Java Native Interface (JNI) and a particular JNI implementation.

31 Claims, 9 Drawing Sheets

METHOD AND SYSTEM FOR PROGRAMMING FIRMWARE OVER A COMPUTER NETWORK

BACKGROUND OF THE INVENTION

1. Field of the Invention

This invention relates generally to computer systems and associated hardware that are connected to a network, and particularly to methods and apparatuses for programming firmware of the associated hardware over the network.

2. Description of the Related Art

Computer systems can incorporate various components, including a central processing unit (CPU), random access memory (RAM), a hard drive, and peripheral devices. Computer systems can also incorporate hardware devices, such as host adapter cards (also known as controllers) that have host adapter integrated circuit (IC) chips and that have programmable read-only memory (ROM) circuitry, collectively termed a ROM. Such ROMs can be set, or programmed, through the use of software that is external to the ROM, such that the ROM then performs in a particular desired way, like hardware. Once so programmed, the ROM functions as would hardware, but because it can be deprogrammed and/or reprogrammed, it is considered to be firmware. As is well known in the art, particular forms of ROM include programmable ROM (PROM), electrically programmable ROM (EPROM), and electrically erasable and programmable ROM (EEPROM) which are sometimes referred to as flash memory. The firmware programming can define operational characteristics of the hardware device, such as a BIOS of a SCSI adapter card. Information regarding the use of flash memory and firmware upgrading can be found in "ASUS PCI-DA2100—PCI to SCSI Disk Array Controller User's Manual—Hardware Installation," ASUSTeK Computer, Inc., 1996, which is incorporated herein by reference.

The programming of such devices is performed by sending particular signals, according to a programming file, to the hardware device, thereby setting particular electrical pathways and configuring particular functionalities within the ROM. The particular signals may be in the form of operational commands, or data bits. Before distribution to consumers or incorporation into a user's local computer system, a hardware device provider can program the ROM, which can be accomplished on a special programming board or by other typical methods known to those skilled in the art. Alternatively, the initial programming of the firmware can be performed after it is installed with the user's local computer system. In addition, while some ROMs can be programmed only once, other hardware devices have reprogrammable ROMs, allowing the user to incorporate new revisions, bugfixes, or updates into the hardware device.

Figure 1:
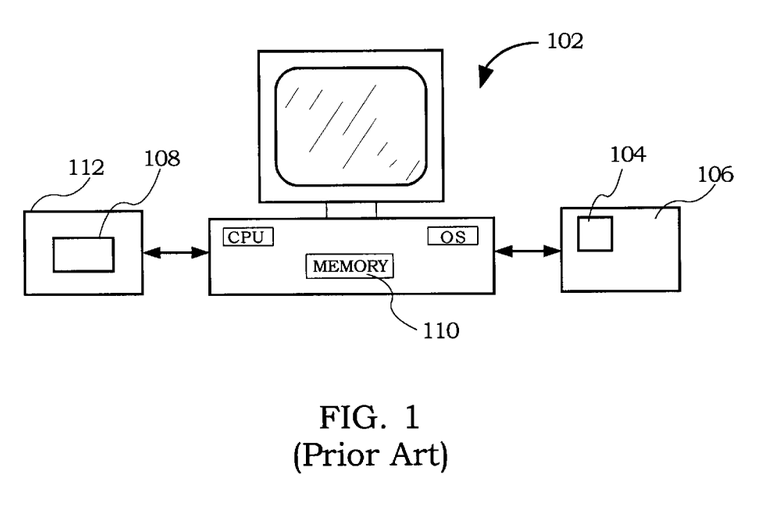
FIG. 1 is a schematic of a computer system of the prior art.

Understanding the programming of a ROM is facilitated by the depiction of a typical local computer system 102 in FIG. 1. Whether programmed for the first time or subsequently, or before or after incorporation with the user's local computer system 102, the ROM 104 of a local hardware device 106 (e.g., a host adapter card) is typically programmed using a programming file that is resident on the same computer system as where the firmware is incorporated. Specifically, the programming file is downloaded from a storage media 108 to some form of memory 110 within the user's local computer system 102, such as random access memory (RAM). A programming application, also downloaded to the user's local computer system memory 110, then uses the programming file to program or reprogram the ROM 104. The storage media 108, can be a readable data storage device such as a floppy disk, compact disc (CD), optical disk, or tape, among others. Alternatively, the programming file and/or application can be downloaded from a remote computer system to which the user's local computer system is connected through a network.

Unfortunately, such programming methods that are typically available to the user may be time consuming and difficult to utilize. For example, if a storage media 108 is used, the user must obtain the storage media itself by either physically procuring or by ordering and then waiting for delivery of the storage media that contains the programming file and programming application. Further, such a method requires that the user's computer system have a device 112 that is capable of reading the storage media. If, on the other hand, the user downloads the file from a remote system through a network, such a download may take a large amount of time.

Additionally, whether using storage media or downloading across a network, a particular programming file and/or programming application may be needed to accommodate the current configuration of the user's local computer system. Therefore, the user must accurately determine various aspects of the current configuration. Such aspects may include the type of operating system (OS) being used on the user's local computer system, or the revision number of the current firmware on a local hardware device that is to be reprogrammed. In addition to the time required to communicate this information, the correct information may not be readily available to the user, and therefore the user may be significantly delayed in programming the local hardware device while the user determines the correct information. Furthermore, any errors in the configuration information used by the user to select a programming file and/or programming application can result in no programming or incorrect programming of the local hardware device, which could render the local hardware device at least temporarily unusable.

Therefore, there is a need for improved techniques for programming programmable hardware devices. In particular, a method and apparatus for more efficiently, more quickly, and more accurately programming programmable hardware devices is needed.

SUMMARY OF THE INVENTION

Broadly speaking, the present invention fills these needs by providing a method and apparatus for programming a programmable hardware device of a local computer system that is connected to a network, by using a programming file that is resident on a remote system which is also connected to the same network. It should be appreciated that the present invention can be implemented in numerous ways, including as a process, an apparatus, a system, a device, a method, or a computer readable medium. Several inventive embodiments of the present invention are described below.

In one embodiment, a method for facilitating programming of a programmable hardware device that is associated with a local system that has a particular computer operating system (OS) is disclosed. The method includes providing a Java-language program that is capable of accessing a programming file having data, providing a Java Native Interface (JNI) implementation that is capable of facilitating a sending of data from the programming file to the programmable hardware device, and providing a Java Native Interface that facilitates communication between the Java-language program and the JNI implementation.

In another embodiment, a method for user programming of a programmable hardware device that is associated with a local system that has a particular computer operating system (OS) includes accessing a programming file having data and located on a computer system that is remote from the local system and connected to the local system through a network, using a Java program. The method also includes retrieving the data from the programming file and sending the retrieved data to the programmable hardware device, such that the retrieving and sending are facilitated by using a particular Java Native Interface (JNI) and a particular JNI implementation.

In yet another embodiment, a computer readable media, containing program instructions for modifying a hardware device that is associated with a computer system that is remote from the computer readable media, includes program instructions for accessing a particular programming file and program instructions for programming the hardware device using data from the particular programming file. In addition, the computer readable media can further include program instructions, in Java program language, for automatically detecting the type of an operating system (OS) of the computer system, and at least one Java Native Interface (JNI) implementation including the program instructions for programming the hardware device using data from the particular programming file. Further, the JNI implementation can include program instructions for automatically detecting a type of a CPU of the computer system, program instructions for automatically detecting a version of, and any revisions and bugfixes of any current programming of the hardware device, and program instructions for automatically detecting a type of the hardware device.

Although the embodiments of the present invention have numerous advantages, the ability of the present invention to automatically determine the configuration of the local computer system provides for more accurate programming. Furthermore, this ability as well as the lack of need for procuring a physical copy and therefore lack of need to have a device for reading the physical copy, provide for quicker programming. These and other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like elements.

DETAILED DESCRIPTION OF THE PREFERRED EMBODIMENTS

An invention is described for a method for programming a programmable hardware device of a local computer system by using a programming file that is resident on a remote system that is connected to the local computer system through a network. In the following description, numerous specific details are set forth in order to provide a thorough understanding of the present invention. It will be obvious, however, to one skilled in the art, that the present invention may be practiced without some or all of these specific details. In other instances, well known process operations have not been described in detail in order not to unnecessarily obscure the present invention.

Figure 2:
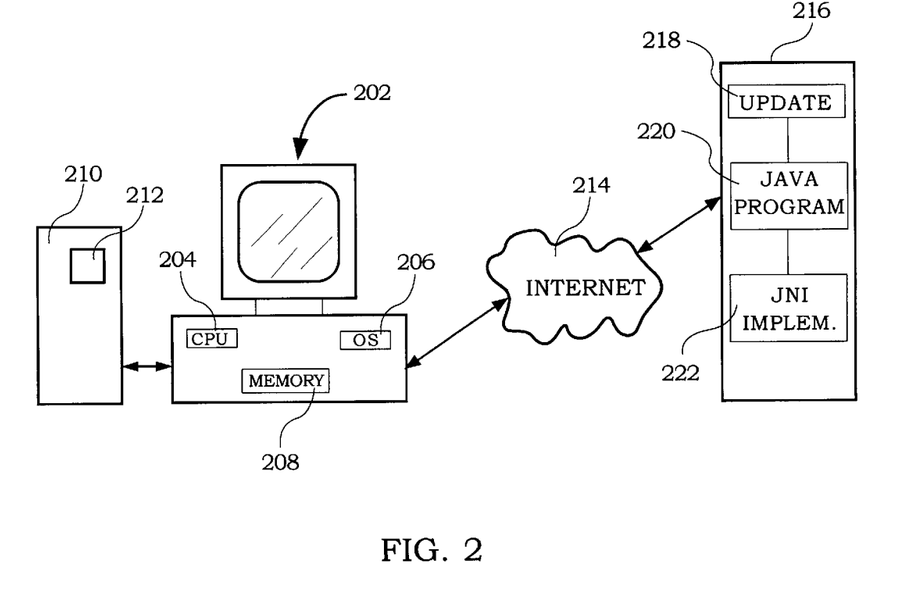
FIG. 2 is a schematic of a computer system connected, through a network, to a remote computer readable medium, according to an embodiment of the present invention.

FIG. 2 illustrates one embodiment of the present invention as used with a local computer system that is connected to a network, specifically the Internet. A local computer system 202 includes a central processing unit (CPU) 204, an operating system 206, and memory 208. The memory 208 may take the form of random access memory (RAM), a hard disk media associated with a hard drive, or other data storage device known to those skilled in the art. The local computer system 202 further includes a local hardware device 210 that incorporates read only memory (ROM) circuitry 212. The local hardware device 210 can either reside on a motherboard that includes the CPU 204 or can reside external to that motherboard, such as on a host adapter board. The ROM circuitry 212 is of a type that can be programmed, such as programmable ROM (PROM), electrically programmable ROM (EPROM), or electrically erasable and programmable ROM (EEPROM), also known as flash memory. The local computer system 202 is connected to the Internet 214 which, in turn, is connected to a computer-readable medium 216 that is located remotely from the local computer system 202. The computer-readable medium 216 can be any medium suitable for storing program instructions that include commands and data bits, and that can be accessed through its connection to the Internet 214. For example, the computer-readable medium 216 can be a hard disk that resides in a Web server (not shown). In such a case, a user of the local computer system 202 can access a Web site that is served by the Web server and thereby access the computer-readable medium 216. The computer-readable medium 216 itself includes a programming file 218 which can contain an update to the ROM circuitry 212 firmware. The computer-readable medium 216 further includes a Java program 220 and a Java Native Interface (JNI) implementation 222. Information regarding the Java programming language, as well as Java native interfaces and implementations, can be found in the text "Java Language API Superbible," D. Groner et al., Waite Group Press, Corte Madera, Calif., 1996, which is incorporated herein by reference. The relationship between the information located on the computer-readable medium 216 and the local hardware device 210 can be further understood with reference to FIG. 3.

Figure 3:
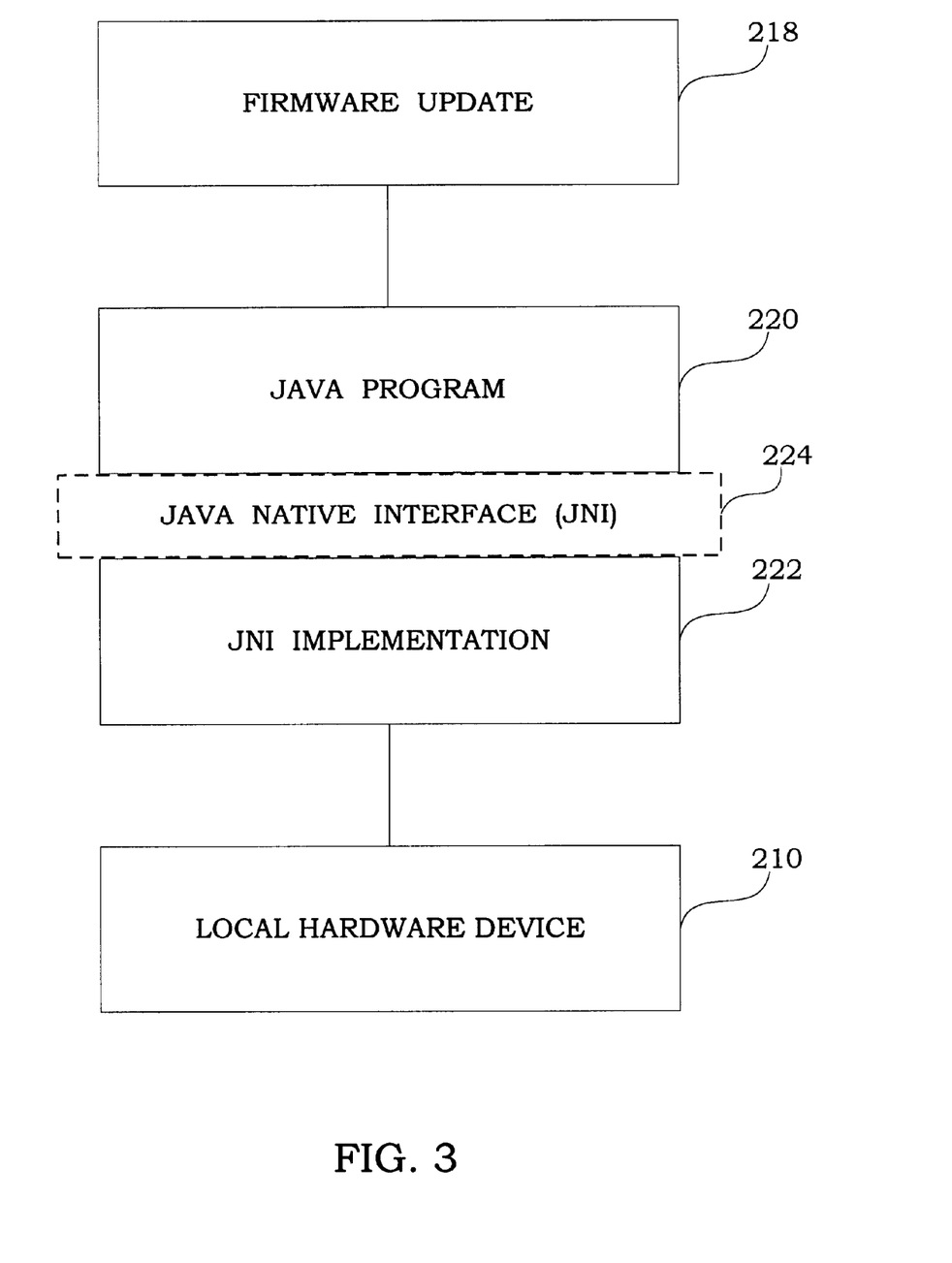
FIG. 3 is a schematic of the interrelation of various programs, data, and a local hardware device, in accordance with an embodiment of the present invention.

As shown in FIG. 3, the programming file 218, which can contain, for example, a firmware update, is accessible by the Java program 220. Because the Java program 220 cannot be directly recognized by nor operated on the local computer system 202, a Java Native Interface (JNI) implementation 222 is provided to interact with the local hardware device 210. The JNI implementation 222 and an associated Java Native Interface (JNI) 224 are configured to translate commands of the Java program 220 into commands that can be recognized by the local computer system 202 and ultimately by the local hardware device 210. Accordingly, a particular JNI implementation is configured to interact correctly with a local computer system having a particular OS. Thus, to provide appropriate translation of the Java program 220 to computer systems having different operating systems, a different JNI implementation is necessary for each of the different operating systems. The protocol concept of a Java Native Interface and the JNI implementation are well known to those skilled in the art.

Figure 4A:
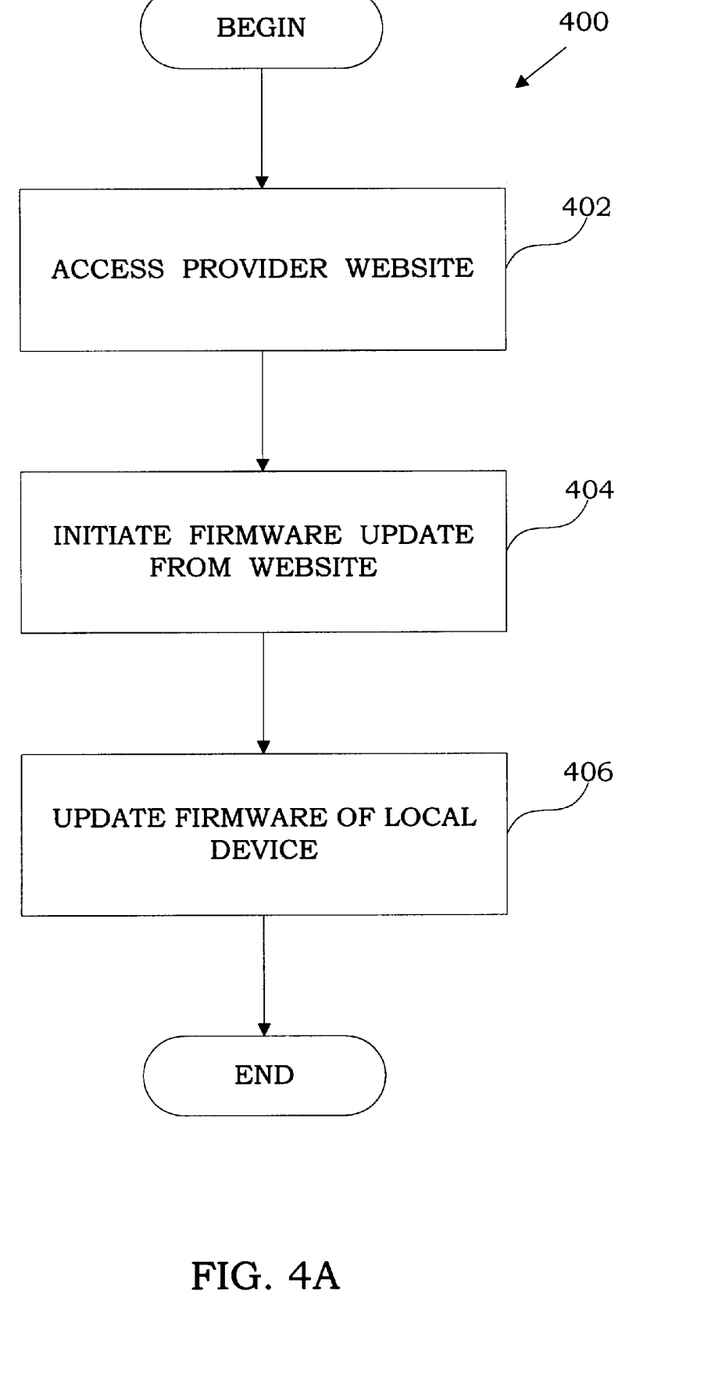
FIG. 4A is a flow chart of a method for programming a ROM of the local hardware device depicted in FIG. 2, according to an embodiment of the present invention.

Another embodiment of the present invention can be understood from the flowchart depicting method 400 in FIG. 4A. After beginning method 400, a user accesses a provider's Web site in operation 402. As noted above, by accessing the provider's Web site over the Internet 214, a user of the local computer system 202 can access the computer-readable medium 216 which contains the above-described programming file, Java program, and JNI implementation. After the provider's Web site is accessed in operation 402, operation 404 involves initiating the firmware update from the Web site. This initiating may include a determination of to what configuration the local hardware device is to be programmed, such as by user selection or input. In operation 406, the local hardware device firmware is updated. While the method 400 is described in terms of operations across the Internet 214, the present invention can likewise be practiced across other forms of networks such as a local area network (LAN), or an Intranet. In addition, although the present embodiment of the invention is described in terms of a firmware update, the present invention can also be used to program the ROM 212 of the local hardware device 210 for a first time.

Figure 4B:
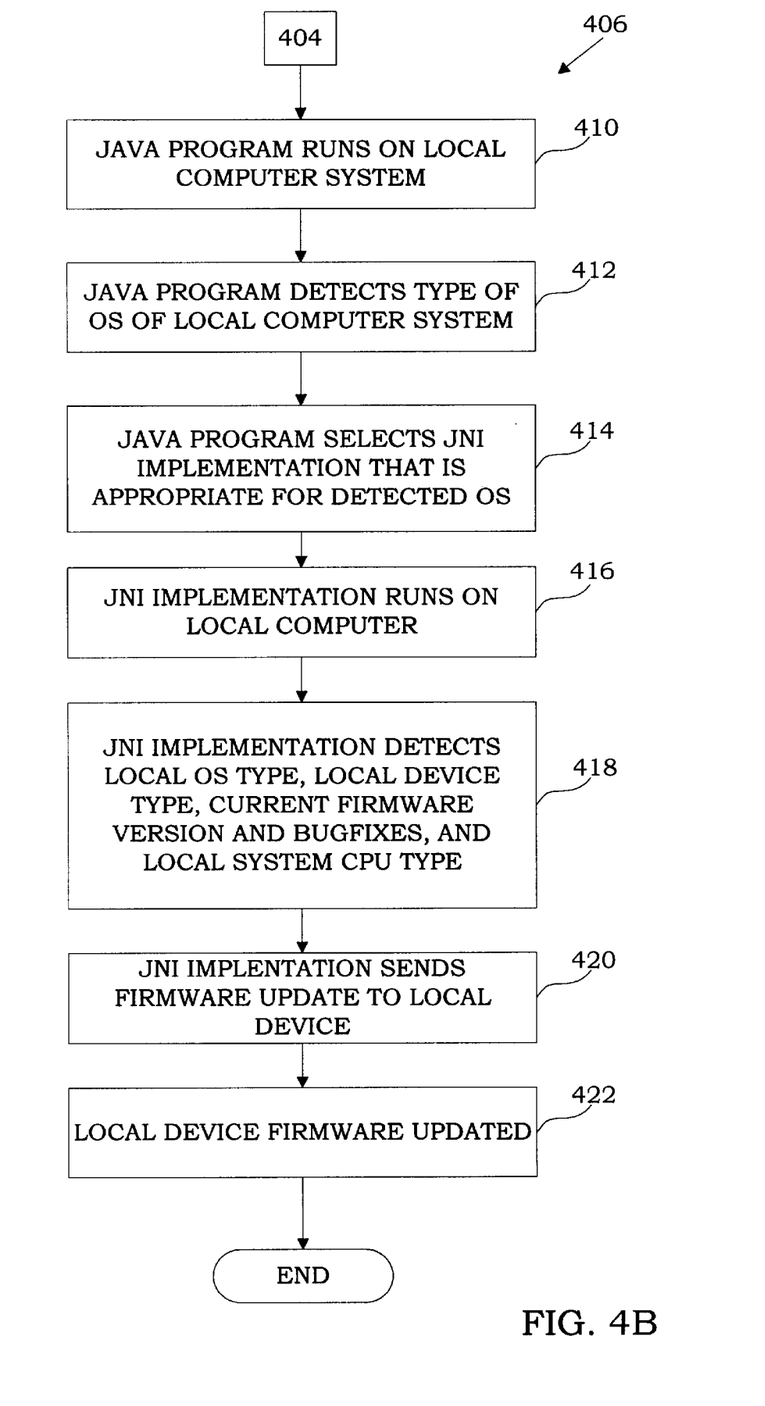
FIG. 4B is a flow chart of the operations included in an operation of the method depicted in FIG. 4A, according to an embodiment of the present invention.

With reference to FIG. 4B, operation 406 can be further understood. After initiating the firmware update in operation 404, operation 410 involves the Java program running on the local computer system. While running, the Java program detects the type of operating system (OS) of the local computer system in operation 412. Once the type of OS is detected in operation 412, operation 414 proceeds with the Java program selecting a JNI implementation that is appropriate for that type of OS. In operation 416, the JNI implementation runs on the local computer system, and in operation 418, detects local system characteristics such as the operating system type, the local hardware device type, the current firmware version and bug fixes, and the local system CPU type. At this point, the JNI implementation can display to the user the detected local system characteristics, as will be discussed with reference to FIGS. 6B and 6C below. After these local system characteristics have been detected, the Java program fetches the appropriate firmware update which it can later provide to the JNI implementation (see operation 422). Before the firmware update is provided to the JNI implementation, the user can be consulted for confirmation of the specific firmware update fetched by the Java program. In addition, the Java program can incorporate input by the user in the fetching of a particular firmware update. Furthermore, the JNI implementation, in operation 422, sends the firmware update received from the Java program to the local hardware device. In operation 422, more specifically, data within the firmware update including operation commands and data bits, are transmitted to the local hardware device. These operation commands and data bits are then utilized in operation 424 to actually update the firmware of the local hardware device. Operation 422 depicted in FIG. 4B can further be understood with reference to FIG. 4C.

Figure 4C:
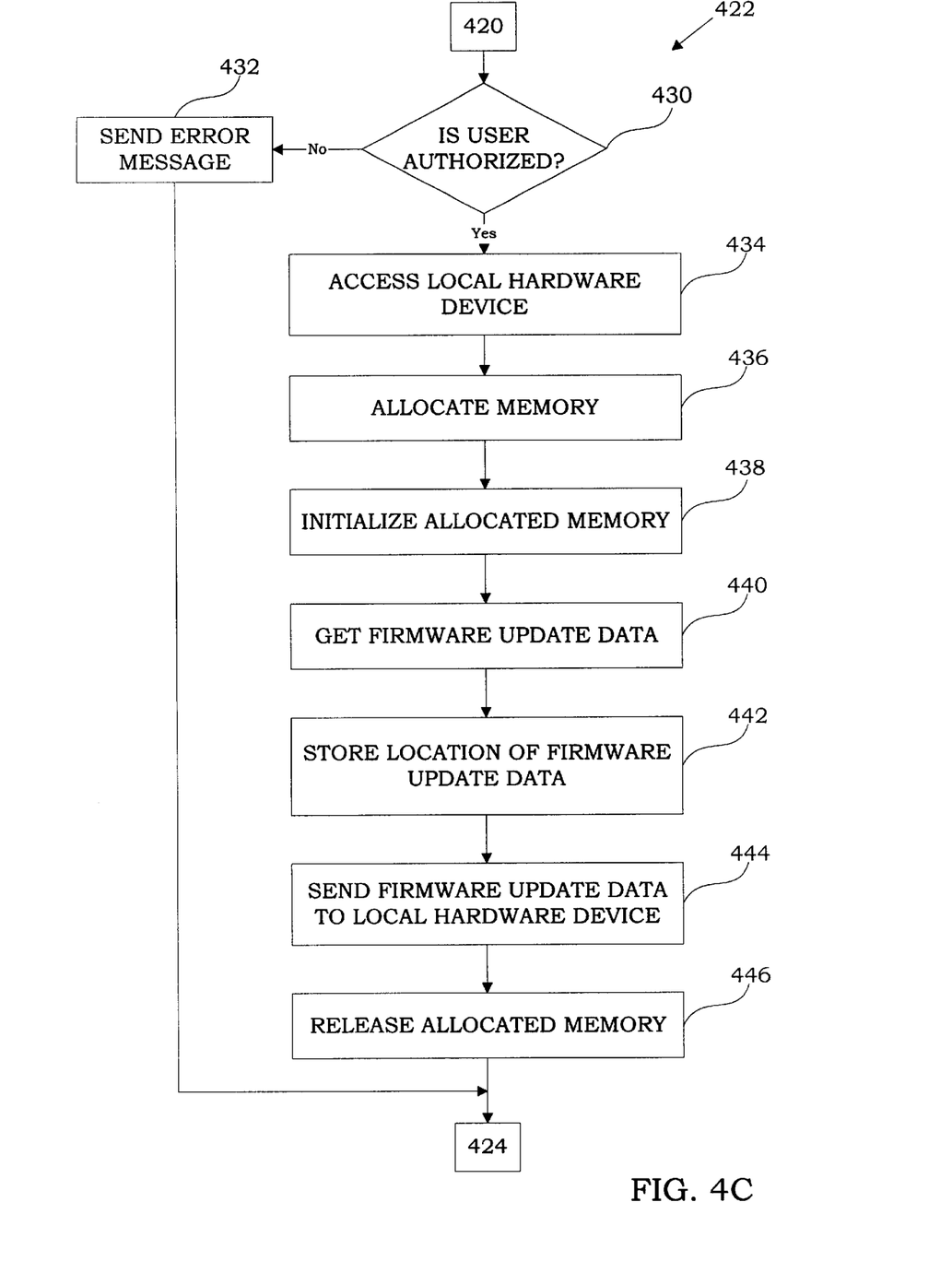
FIG. 4C is a flow chart of the operations included in one of the operations depicted in FIG. 4B, according to an embodiment of the present invention.

After the JNI implementation has been provided with the appropriate firmware update in operation 420, the JNI implementation determines, in operation 430 of FIG. 4C, whether the user of the local computer system is authorized to make such an update. The JNI implementation makes this determination based upon information previously communicated regarding which users are authorized to make the update. If the user is not authorized, an error message is sent in operation 432, and the program ends. In contrast, if the user is determined to be authorized, operation 422 continues with the JNI implementation accessing the local hardware device in operation 434. In operation 436, a portion (the size of which is determined by the programming file 218) of the memory 208 of the local computer system 202 is allocated. The memory allocated in operation 436 is then initialized in operation 438. In operation 440, the JNI implementation then gets the firmware update data from the Java program. In operation 440, the JNI implementation places the firmware update data into the memory that has been allocated and initialized in operations 436 and 438, respectively. The location of the firmware update data in this memory is then stored in operation 442. Operation 444 proceeds with sending the firmware update data, using the stored location in operation 442, from the allocated and initialized memory to the local hardware device 210. Once the firmware update data is sent to the local hardware device in operation 444, the allocated and initialized memory is released in operation 446.

Figure 5:
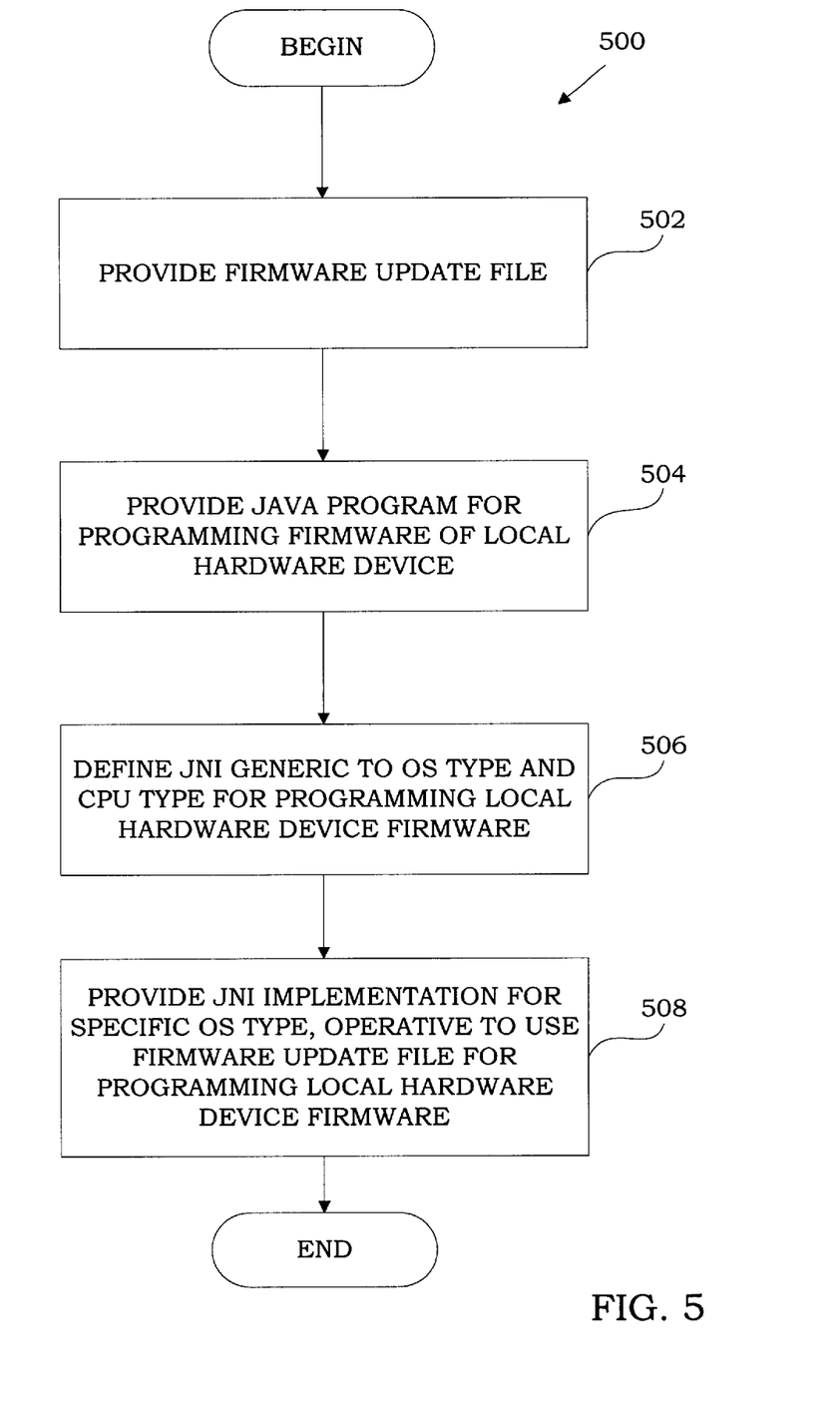
FIG. 5 is a flow chart depicting a method for facilitating the programming of a ROM, according to another embodiment of the present invention.

While the method 400 depicted in FIGS. 4A through 4C is a method of programming a local hardware device 210, a method 500 for facilitating such programming of the local hardware device is depicted in FIG. 5. In operation 502, a firmware update file is provided. This may include generating and/or placing a file, including command operations and data bits, on a computer-readable medium 216 that is readable over a network such as the Internet 214 from a local computer system 202. Also on such computer-readable medium 216, method 500 includes providing a Java program for programming firmware of a local hardware device in operation 504. Further, in operation 506 a JNI that is generic to the operating system type and CPU type is defined for programming the firmware of a local hardware device using the Java program provided in operation 504. Also in operation 508, a JNI implementation is provided for a specific operating system (OS) type and is operative to use the firmware update file for programming local hardware device firmware. To support various updates to firmware, multiple firmware update files can be provided. In addition, the firmware update file provided in operation 502 can be configured to provide data for a particular operating system type, CPU type, the type of local hardware device, and firmware version and/or bug fixes of the firmware of the local hardware device. Similarly, multiple JNI implementations can be provided for other operation system types.

Figure 6A:
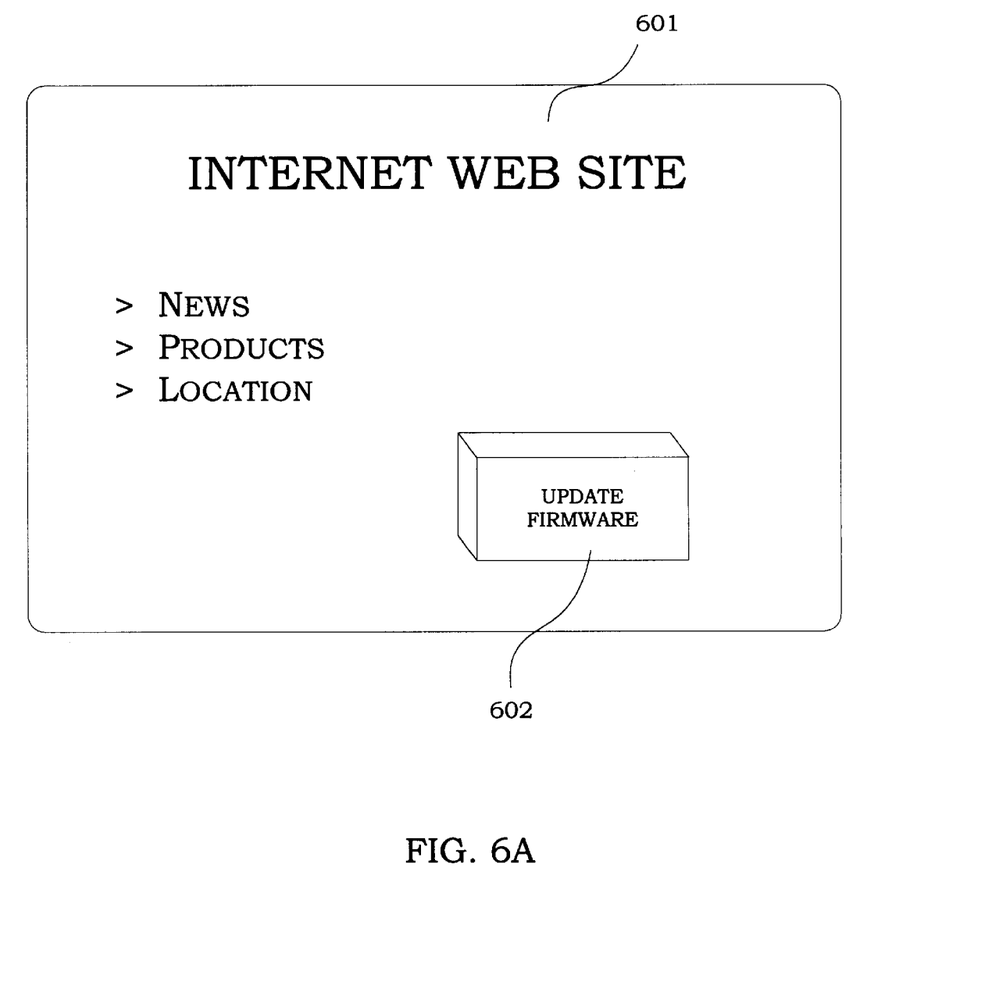
FIGS. 6A–6C depict schematics representing computer screens provided as a graphical user interface, according to yet another embodiment of the present invention.
Figure 6B:
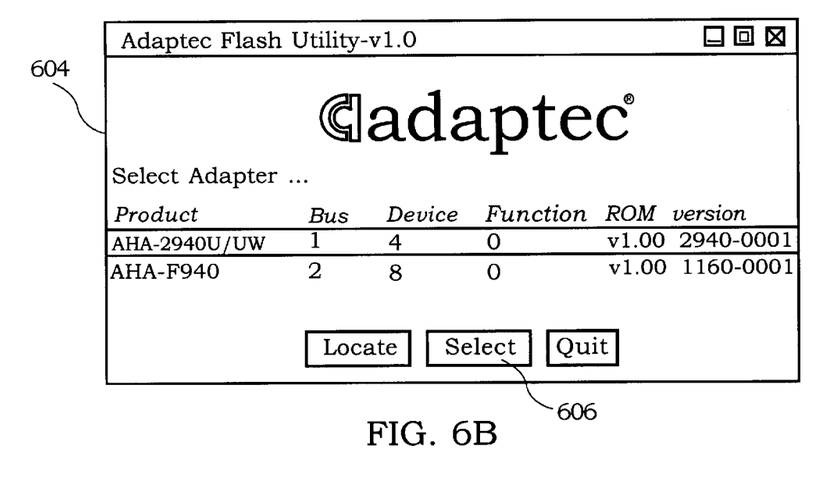
Figure 6C:
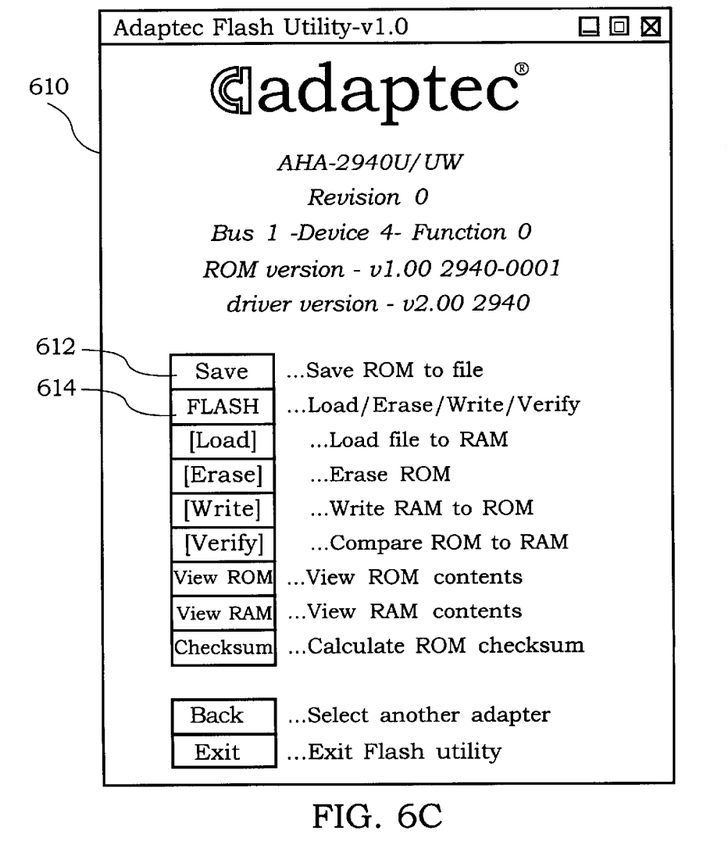

In yet another embodiment of the present invention, a graphic user interface (GUI) is provided on the provider Web site to facilitate a user of a local system 202 in updating the firmware 212 of a local hardware device 210. As shown in FIG. 6A, the Web site can display a portion of the screen identified as a button which can be selected to initiate updating of the firmware. After the firmware update is initiated, a screen 604 such as that depicted in FIG. 6B, can be displayed. In screen 604, the local hardware devices which were detected, along with the current firmware version for that local hardware device, is displayed. From screen 604, the local hardware device that the user desires to update can be highlighted and then selected through the user's selection of the area of the screen indicated as a select button 606. FIG. 6C depicts a screen 610 that is displayed after the user selects the desired local hardware device. In screen 610, the device identifier along with the firmware version and any bug fix identifier is displayed. Also displayed are areas of the screen 610 which are identified for various operations that are available to the user. For example, a save button 612 is available for saving the current version of the firmware to a file in the memory of the local computer system. Also a flash button 614 is provided whose selection by the user causes loading of the update file to the RAM of the local computer system, the erasing of the local hardware device ROM, the writing of the update file from the RAM to the ROM, and comparison of the now-updated ROM to the update file on the RAM so as to verify that the update has been properly completed. In addition, other operations can be made available to the user by identifying portions of the screen that can be selected by the user.

The invention may employ various computer-implemented operations involving data stored in computer systems to drive computer software, including application programs, operating system programs, peripheral device drivers, etc. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 7:
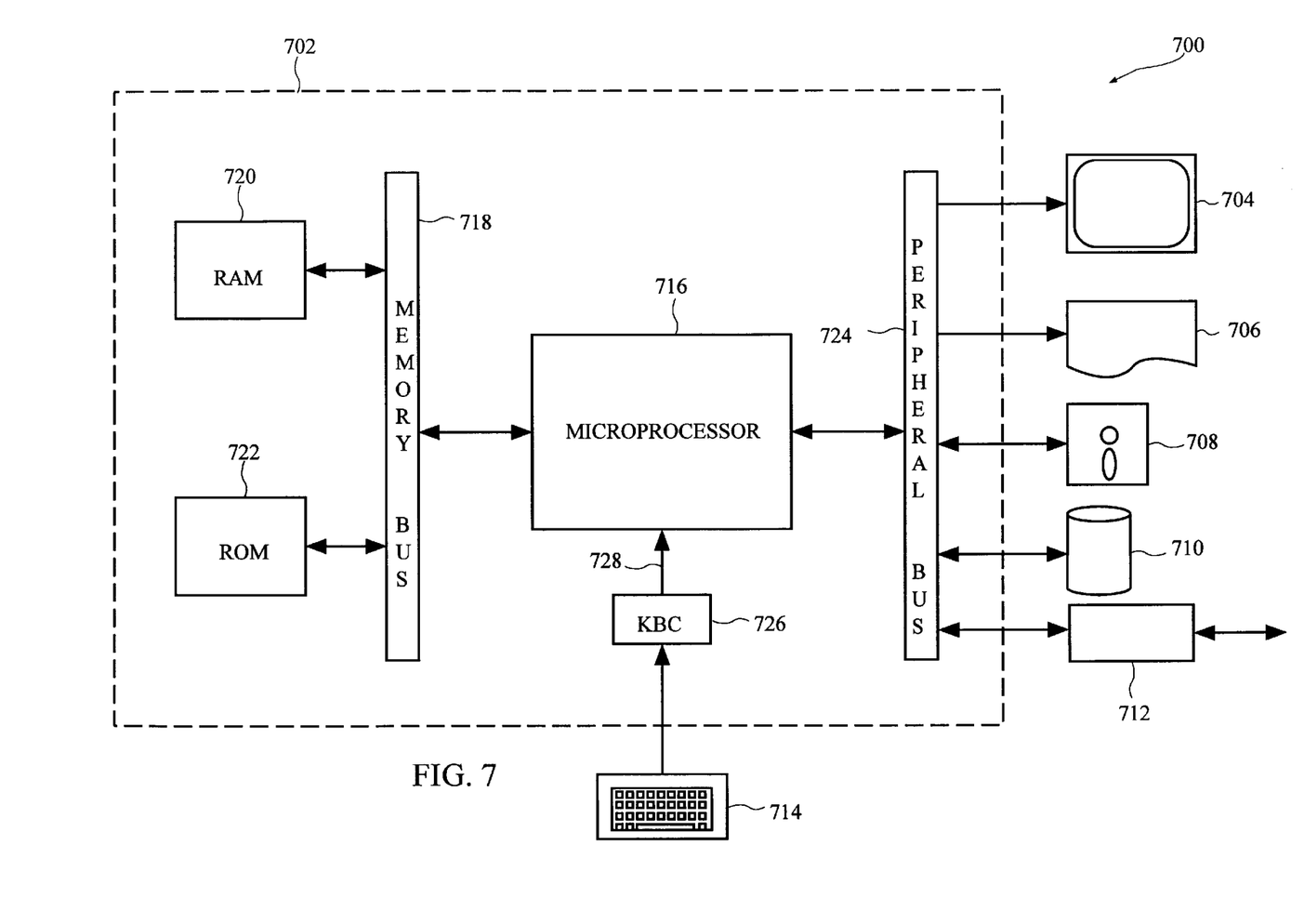
FIG. 7 depicts a computer system for performing program instructions according to various embodiments of the present invention.

FIG. 7 is a block diagram of an exemplary computer system 700 for carrying out the processing according to the invention. The computer system 700 includes a digital computer 702, a display screen (or monitor) 704, a printer 706, a floppy disk drive 708, a hard disk drive 710, a network interface 712, and a keyboard 714. The digital computer 702 includes a microprocessor 716, a memory bus 718, random access memory (RAM) 720, read only memory (ROM) 722, a peripheral bus 724, and a keyboard controller (KBC) 726. The digital computer 702 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 716 is a general purpose digital processor which controls the operation of the computer system 700. The microprocessor 716 can be a single-chip processor or can be implemented with multiple components. Using instructions retrieved from memory, the microprocessor 716 controls the reception and manipulation of input data and the output and display of data on output devices. According to the invention, a particular function of microprocessor 716 is to assist in execution and rendering of the software operations of the JNI implementation.

The memory bus 718 is used by the microprocessor 716 to access the RAM 720 and the ROM 722. The RAM 720 is used by the microprocessor 716 as a general storage area and as scratch-pad memory, and can also be used to store input data and processed data. The ROM 722 can be used to store instructions or program code followed by the microprocessor 716 as well as other data.

The peripheral bus 724 is used to access the input, output, and storage devices used by the digital computer 702. In the described embodiment, these devices include the display screen 704, the printer device 706, the floppy disk drive 708, the hard disk drive 710, and the network interface 712. The keyboard controller 726 is used to receive input from keyboard 714 and send decoded symbols for each pressed key to microprocessor 716 over bus 728.

The display screen 704 is an output device that displays images of data provided by the microprocessor 716 via the peripheral bus 724 or provided by other components in the computer system 700. The printer device 706, when operating as a printer, provides an image on a sheet of paper or a similar surface. Other output devices such as a plotter, typesetter, etc. can be used in place of, or in addition to, the printer device 706.

The floppy disk drive 708 and the hard disk drive 710 can be used to store various types of data. The floppy disk drive 708 facilitates transporting such data to other computer systems, and hard disk drive 710 permits fast access to large amounts of stored data.

The microprocessor 716 together with an operating system operate to execute computer code and produce and use data. The computer code and data may reside on the RAM 720, the ROM 722, or the hard disk drive 710. The computer code and data could also reside on a removable program medium and loaded or installed onto the computer system 700 when needed. Removable program media include, for example, CD-ROM, PC-CARD, floppy disk and magnetic tape.

The network interface 712 is used to send and receive data over a network connected to other computer systems. An interface card or a similar device and appropriate software implemented by the microprocessor 716 can be used to connect the computer system 700 to an existing network and transfer data according to standard protocols.

The keyboard 714 is used by a user to input commands and other instructions to the computer system 700. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory (ROM), random-access memory (RAM), CD-ROMs, magnetic tape, and optical data storage devices. The computer readable medium can also be distributed over a network that couples computer systems so that the computer readable code is stored and executed in a distributed fashion.

Furthermore, the same or similar methods and apparatuses described above for programming a hardware device can also be used for performing other particular maintenance operations on the hardware device. For example, operations such as erasing a ROM, reading a ROM, or performing a checksum on a ROM can be performed.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for facilitating programming of a programmable hardware device that is associated with a local system that has a particular computer operating system (OS), the method comprising:

providing a Java-language program that is capable of accessing a programming file having data;

providing a Java Native Interface (JNI) implementation and another Java Native Interface (JNI) implementation, each of the Java Native Interface (JNI) implementation and the another Java Native Interface (JNI) implementation being capable of facilitating a sending of data from the programming file to the programmable hardware device; and providing a Java Native Interface that facilitates communication between the Java-language program and one of the JNI implementation and the another JNI implementation depending on a type of the particular computer operating system (OS).

2. A method as recited in claim 1, wherein the providing the Java-language program includes providing a first Java program portion that is operative to fetch the programming file that is specific for the programmable hardware device, the local system, and a desired programming of the programmable hardware device.

3. A method as recited in claim 1, wherein the providing the Java-language program includes providing a second Java program portion that is operative to identify the type of the OS, and to fetch one of the JNI implementation and the another JNI implementation based on the type of the OS that is identified.

4. A method as recited in claim 1, wherein the JNI implementation and the another JNI implementation correspond to different types of computer operating systems, and wherein the providing the Java-language program includes providing a second Java program portion that is operative to identify the type of the OS, and to fetch one of the JNI implementation and the another JNI implementation, depending upon the type of OS that is identified.

5. The method as recited in claim 4, further comprising:

providing the programming file such that it is accessible from the local system through a network, and wherein the Java-language program, the JNI implementation, and the Java Native Interface are each accessible from the local system through the network.

6. The method as recited in claim 5, wherein the network includes a combination of one or more of a local area network, a wide area network, an intra-net, and the Internet.

7. The method as recited in claim 1, further comprising:

providing the programming file in the form of a program instruction set.

8. The method as recited in claim 1, wherein the programmable hardware device is a read-only memory (ROM) circuit that is connected to a printed circuit board (PCB).

9. The method as recited in claim 8, wherein the PCB is one of a motherboard or a host adapter card.

10. The method as recited in claim 8, wherein the PCB is a SCSI host adapter card.

11. A method for facilitating performing maintenance operations on a hardware device that is associated with a local system, the method comprising:

providing a maintenance file that is located on a system that is remote from the local system;

providing a Java language program for accessing the maintenance file from the local system, wherein the Java language program is capable of detecting a type of a particular computer operating system (OS) of the local system; and providing a particular Java Native Interface (JNI) implementation depending on the type of the OS, wherein the JNI implementation is configured to receive data from the Java language program, the data representing data from the maintenance file, and further configured to perform maintenance on the hardware device according to the maintenance file.

12. The method of claim 11, wherein the system that is remote from the local system is connected to the local system through a network and the hardware device is on one of a host adapter card and a motherboard of the local system.

13. The method of claim 12, further comprising:

providing a Java Native Interface that is configured to facilitate communication between the Java language program and the Java Native Interface implementation.

14. A method for user programming of a programmable hardware device that is associated with a local system that has a particular computer operating system (OS), the method comprising:

accessing a programming file having data and located on a computer system that is remote from the local system and connected to the local system through a network, using a Java program capable of determining a type of the OS;

retrieving the data from the programming file; and sending the retrieved data to the programmable hardware device, such that the retrieving and sending are facilitated by using a particular Java Native Interface (JNI) and a particular JNI implementation selected according to the type of the OS of the local system.

15. The method as recited in claim 14, wherein the sending data to said programmable hardware device includes sending operation commands and data bits that are configured to program the programmable hardware device.

16. The method as recited in claim 14, wherein the programming file is a hardware programming file.

17. The method as recited in claim 14, further comprising:

initiating the Java program;

determining the type of the OS by using the Java program; and selecting the particular JNI implementation according to the type of the OS.

18. The method as recited in claim 17, wherein the initiating the Java program includes running the Java program on the local system.

19. The method as recited in claim 17, further comprising:

automatically detecting a type of the programmable hardware device by using the JNI implementation;

automatically detecting any current programming of the programmable hardware device by using the JNI implementation;

automatically detecting any bugfixes to the any current programming of the programmable hardware device by using the JNI implementation; and automatically detecting a type of a CPU associated with the programmable hardware device by using the JNI implementation, wherein the accessing the programming file is influenced by the any current programming, the any bugfixes, and the type of CPU.

20. The method as recited in claim 19, wherein the automatically detecting the type of the programmable hardware device includes running the JNI implementation on the local system.

21. A computer readable media containing program instructions for modifying a hardware device that is associated with a computer system that is remote from the computer readable media, the computer readable media comprising:

program instructions for accessing a particular programming file; and at least one Java Native Interface (JNI) implementation including program instructions for programming the hardware device using data from the particular programming file, wherein the Java Native Interface (JNI) implementation is capable of detecting a type of a CPU of the computer system, a version of, and any revisions and bugfixes of any current programming of the hardware device, and a type of the hardware device.

22. The computer readable media as recited in claim 21, further comprising:

program instructions, in Java program language, for automatically detecting the type of an operating system (OS) of the computer system; and program instructions for automatically selecting one of the at least one Java Native Interface (JNI) implementation according to the type of OS of the computer system.

23. The computer readable media as recited in claim 22, wherein the Java Native Interface (JNI) implementation further comprises:

program instructions for automatically detecting the type of the CPU of the computer system;

program instructions for automatically detecting the version of, and any revisions and bugfixes of any current programming of the hardware device; and program instructions for automatically detecting the type of the hardware device.

24. The computer readable media as recited in claim 23, wherein the program instructions for accessing a particular programming file are influenced by the type of CPU of the computer system, the version of, and any revisions and bugfixes of any current programming of the hardware device, and the type of the hardware device.

25. The computer readable media as recited in claim 22, further comprising:

program instructions for providing a Java Native Interface between the program instructions in Java program language and the JNI implementation.

26. The computer readable media as recited in claim 22, further comprising another JNI implementation that is operative to run on another computer system having an OS of a different type than that of the computer system having the hardware device.

27. The computer readable media as recited in claim 22, wherein the program instructions for programming the hardware device using data from the particular programming file comprises:

program instructions for determining whether a user who is initiating the program instructions for sending data from the particular programming file to the hardware device has permission to do so;

program instructions for accessing the hardware device;

program instructions for allocating memory within the computer system;

program instructions for initializing the memory that has been allocated;

program instructions for accessing the data of the programming file and placing a copy of the data in the memory that has been allocated and initialized;

program instructions for storing the particular location of the copy of the data in the memory that has been allocated and initialized;

program instructions for sending data of the particular programming file to the hardware device using the particular location that was stored; and program instructions for releasing the memory that has been allocated and initialized.

28. A method for facilitating programming of a programmable hardware device that is associated with a local system that has a particular computer operating system (OS), the method comprising:

providing a Java-language program that is capable of accessing a programming file having data;

providing a Java Native Interface (JNI) implementation that is capable of facilitating a sending of data from the programming file to the programmable hardware device;

providing a Java Native Interface that facilitates communication between the Java-language program and the JNI implementation; and providing another JNI implementation that is capable of sending data from the programming file to the programmable hardware device, wherein the JNI implementation and the another JNI implementation correspond to different types of computer operating systems, and wherein the providing the Java-language program includes providing a second Java program portion that is operative to identify a type of the OS, and to fetch one of the JNI implementation and the another JNI implementation, depending upon the type of OS that is identified.

29. A method for user programming of a programmable hardware device that is associated with a local system that has a particular computer operating system (OS), the method comprising:

accessing a programming file having data and located on a computer system that is remote from the local system and connected to the local system through a network, using a Java program;

retrieving the data from the programming file;

sending the retrieved data to the programmable hardware device, such that the retrieving and sending are facilitated by using a particular Java Native Interface (JNI) and a particular JNI implementation;

initiating the Java program;

determining a type of the OS by using the Java program; and selecting the particular JNI implementation according to the type of the OS.

30. A computer readable media containing program instructions for modifying a hardware device that is associated with a computer system that is remote from the computer readable media, the computer readable media comprising:
  program instructions for accessing a particular programming file;
  program instructions, in Java program language, for automatically detecting the type of an operating system (OS) of the computer system;
  at least one Java Native Interface (JNI) implementation including a program instructions for programming the hardware device using data from the particular programming file, wherein the Java Native Interface (JNI) implementation includes:
    program instructions for automatically detecting a type of a CPU of the computer system;
    program instructions for automatically detecting a version of, and any revisions and bugfixes of any current programming of the hardware device; and
    program instructions for automatically detecting a type of the hardware device; and
  program instructions for automatically selecting one of the at least one Java Native Interface (JNI) implementation according to the type of OS of the computer system.

31. A computer readable media containing program instructions for modifying a hardware device that is associated with a computer system that is remote from the computer readable media, the computer readable media comprising:
  program instructions for accessing a particular programming file;
  program instructions, in Java program language, for automatically detecting the type of an operating system (OS) of the computer system;
  at least one Java Native Interface (JNI) implementation including a program instructions for programming the hardware device using data from the particular programming file;
  program instructions for automatically selecting one of the at least one Java Native Interface (JNI) implementation according to the type of OS of the computer system; and
  another JNI implementation that is operative to run on another computer system having an OS of a different type than that of the computer system having the hardware device.

* * * * *